(12) United States Patent
Finocchio

(10) Patent No.: US 8,133,119 B2
(45) Date of Patent: Mar. 13, 2012

(54) ADAPTATION FOR ALTERNATE GAMING INPUT DEVICES

(75) Inventor: Mark J. Finocchio, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 480 days.

(21) Appl. No.: 12/363,543

(22) Filed: Jan. 30, 2009

(65) Prior Publication Data

US 2010/0081507 A1  Apr. 1, 2010

Related U.S. Application Data

(60) Provisional application No. 61/101,966, filed on Oct. 1, 2008.

(51) Int. Cl.
A63F 9/24 (2006.01)
A63F 13/00 (2006.01)

(52) U.S. Cl. .......... 463/37; 463/32; 463/33; 463/36; 463/38; 463/40; 463/41; 463/42; 463/45; 463/48

(58) Field of Classification Search .......... 463/37, 463/38
See application file for complete search history.

(56) References Cited

U.S. PATENT DOCUMENTS

| | | | | |
|---|---|---|---|---|
| 5,929,844 A * | 7/1999 | Barnes | ........................ | 345/156 |
| 6,057,909 A | 5/2000 | Yahav et al. | | |
| 6,100,517 A | 8/2000 | Yahav et al. | | |
| 6,203,432 B1 * | 3/2001 | Roberts et al. | ................ | 463/37 |
| 6,450,820 B1 * | 9/2002 | Palsson et al. | ............... | 434/236 |
| 6,463,487 B1 | 10/2002 | Ternullo | | |
| 6,488,584 B2 * | 12/2002 | Nelson | ............................ | 463/37 |
| 6,498,628 B2 | 12/2002 | Iwamura | | |
| 6,502,515 B2 | 1/2003 | Burckhardt et al. | | |
| 6,614,420 B1 * | 9/2003 | An et al. | ....................... | 345/161 |
| 6,771,277 B2 | 8/2004 | Ohba | | |
| 6,786,823 B2 | 9/2004 | Huang et al. | | |
| 7,006,236 B2 | 2/2006 | Tomasi et al. | | |
| 7,046,229 B1 * | 5/2006 | Drake | ........................... | 345/156 |
| 7,050,177 B2 | 5/2006 | Tomasi et al. | | |
| 7,151,530 B2 | 12/2006 | Roeber et al. | | |
| 7,224,384 B1 | 5/2007 | Iddan et al. | | |
| 7,293,356 B2 | 11/2007 | Sohn et al. | | |

(Continued)

FOREIGN PATENT DOCUMENTS

WO  WO 99/15863 A1  4/1999

(Continued)

OTHER PUBLICATIONS

Howard, R., "Xbox 360 Keyboard and Mouse: Round Two," Nvirt, http://nvirt.com/2008/02/02/xbox-360-keyboard-and-mouse-round-2-2/, Feb. 2, 2008, p. 1-4.

(Continued)

*Primary Examiner* — N Drew Richards
*Assistant Examiner* — John P Dulka
(74) *Attorney, Agent, or Firm* — Woodcock Washburn LLP

(57) ABSTRACT

Mechanisms for adjusting signals between gaming controllers and gaming consoles are disclosed. In an embodiment, the output signals of a mouse control a gaming console which is normally controlled by an analog thumbstick. The output signals of mouse are adjusted to compensate for the analog thumbstick controller assist techniques employed by the gaming console. The adjusted signals are sent to the gaming console. The result is that the user is able to control the game using the mouse and have the same feel as if the user was using the analog thumbstick controller.

21 Claims, 4 Drawing Sheets

U.S. PATENT DOCUMENTS

| | | |
|---|---|---|
| 7,310,431 B2 | 12/2007 | Gokturk et al. |
| 7,340,077 B2 | 3/2008 | Gokturk et al. |
| 2004/0207597 A1 | 10/2004 | Marks |
| 2004/0222965 A1* | 11/2004 | Riccomini et al. ............ 345/156 |
| 2005/0059488 A1 | 3/2005 | Larsen et al. |
| 2005/0119036 A1 | 6/2005 | Albanna et al. |
| 2005/0176504 A1* | 8/2005 | Stanley ........................ 463/37 |
| 2005/0176505 A1 | 8/2005 | Stanley |
| 2005/0195166 A1* | 9/2005 | Cooper et al. ................ 345/161 |
| 2006/0188144 A1 | 8/2006 | Sasaki et al. |
| 2006/0239558 A1 | 10/2006 | Rafii et al. |
| 2007/0013718 A1 | 1/2007 | Ohba |
| 2007/0060336 A1 | 3/2007 | Marks et al. |
| 2007/0098222 A1 | 5/2007 | Porter et al. |
| 2007/0216894 A1 | 9/2007 | Garcia et al. |
| 2007/0260984 A1 | 11/2007 | Marks et al. |
| 2007/0279485 A1 | 12/2007 | Ohba et al. |
| 2007/0281828 A1 | 12/2007 | Rice |
| 2007/0283296 A1 | 12/2007 | Nilsson |
| 2007/0298882 A1 | 12/2007 | Marks et al. |
| 2008/0001951 A1 | 1/2008 | Marks et al. |
| 2008/0062257 A1 | 3/2008 | Corson |
| 2008/0100620 A1 | 5/2008 | Nagai et al. |
| 2008/0126937 A1 | 5/2008 | Pachet |
| 2008/0134102 A1 | 6/2008 | Movold et al. |
| 2008/0211768 A1* | 9/2008 | Breen et al. .................. 345/157 |
| 2008/0215972 A1 | 9/2008 | Zalewski et al. |
| 2008/0215973 A1 | 9/2008 | Zalewski et al. |
| 2008/0248882 A1* | 10/2008 | Hsu ................................ 463/47 |
| 2009/0167679 A1 | 7/2009 | Klier et al. |
| 2010/0069154 A1* | 3/2010 | Claussen ........................ 463/37 |

FOREIGN PATENT DOCUMENTS

| | | |
|---|---|---|
| WO | WO 01/59975 A3 | 1/2002 |
| WO | WO 02/082249 A2 | 10/2002 |
| WO | WO 03/001722 A3 | 3/2003 |
| WO | WO 03/046706 A1 | 6/2003 |
| WO | WO 03/073359 A3 | 11/2003 |
| WO | WO 03/054683 A3 | 12/2003 |
| WO | WO 03/071410 A3 | 3/2004 |

OTHER PUBLICATIONS

Chen, J., "XCM XFPS Xbox 360 Keyboard/Mouse Adapter Available Now," GizmoDo, http://gizmodo.com/gadgets/peripherals/xcm-xfps-xbox-360-keyboardmouse-adapter-available-now-223087.php, Dec. 19, 2006, p. 1-8.

Verrault, M. (screen name matqc21), "Mouse and Keyboard Input Configuration Guide for Xbox 360 by matqc21," IGN FAQ's, http://faqs.ign.com/articles/846/846694p1.html, Jan. 21, 2008, p. 1-15.

"PS2/N64 to PC Adapter," ElectricQuarter.com, http://www.electricquarter.com/drivers.htm, © 1996-2007, downloaded Oct. 13, 2008, p. 1-2.

Richter, J., "Alternative Input Devices at E3," Richter Scale® Articles, http://www.richterscale.org/index.php/weblog_articles/alternative_input_devices_at_e3/, Jun. 9, 2006, p. 1-6.

* cited by examiner

ADAPTATION FOR ALTERNATE GAMING INPUT DEVICES

CROSS REFERENCE TO RELATED APPLICATIONS

The present application claims priority to U.S. Provisional Application No. 61/101,966, filed Oct. 1, 2008 and entitled "Adaptation for Alternate Gaming Input Devices", and herein incorporated by reference in its entirety.

COPYRIGHT NOTICE AND PERMISSION

A portion of the disclosure of this document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2008 Microsoft Corp.

FIELD OF TECHNOLOGY

The presently disclosed subject matter relates to the field of console gaming in general. More particularly, the subject matter relates to the use of gaming controllers to control gaming consoles, where the gaming controllers are not the standard controllers for the gaming console.

BACKGROUND

Console gaming (e.g., XBOX, PLAYSTATION) is performed using some type of controller for all human-game interaction. Many gaming consoles are configured to be controlled by only one type of gaming controller ("standard controller"). However, users may want to use a gaming controller which is not the type of controller for which the gaming console is configured ("alternate controller").

Gaming consoles employ various techniques to enable players to perform high-precision gaming using inherently low-precision devices. For example, first-person shooter ("FPS") games require a high level of precision to play, but are frequently controlled with low-precision controllers such as dual thumb-controlled analog sticks ("thumbsticks"). Different gaming consoles and games use a variety of core techniques to give the user the feel of high precision control. Such core techniques include:

Aim assist: Aim assist enables precise aiming using an analog thumbstick via a technique called "sticky aim". It gives the player a level of control typically not possible without it. "Sticky aim" techniques include: (a) temporarily slowing the aiming indicator (reticule, cursor, etc.) as it passes over an actionable target; and (b) automatically moving the aiming indicator on the users behalf as a target passes under the indicator.

Dead zone: Dead zone is used to compensate for the low quality and noisy devices used for the physical makeup of analog thumbsticks. These devices consist of potentiometers (variable resistors) and springs. The mechanical nature of these devices make it so that they seldom return to the exact same rest position when the user is no longer touching the stick. This means that "zero" (or rest, home) position is not consistent. To compensate for this behavior, game makers introduce what is called a "dead zone". A dead zone is an area of stick movement that does not register as movement in the game. Examples of dead zones include: (a) a dead zone shape (typically square or circular) that defines the geometric bounds of region; and (b) a dead zone magnitude that describes the size (extent) of the region (e.g. the radius of zone if it is circular).

Acceleration: While gaming with an analog thumbstick, due to lack of precision, the player will typically move the thumbstick further in a direction than intended (especially in faster paced twitch games). Where thumbstick position indicates velocity, rather than immediately switching to the velocity indicated by the thumbstick position, games will typically accelerate to that velocity so the player perceives higher control.

Axis-dependent movement sensitivity: Games will assign different sensitivity levels depending on the direction the analog thumbstick is pointing. For example, players will typically have more precision with thumb movements horizontally than with thumb movements vertically. In order to account for this, gaming consoles and games will then decrease sensitivity in the vertical direction and other directions (such as diagonally).

The above-mentioned control assist techniques are employed to give the user the correct "feel" to the gaming experience when using a standard controller. If one were to adapt an alternate controller, which does not have the same limitations as the standard controller, for control of the gaming consol, the user will not have the right "feel" in the game.

For example, if a user wants to control the aim in a FPS where an analog thumbstick is the standard controller, it is possible to adapt an alternate device, such as a mouse or a hand held pointing device, to perform the same aim function as the thumbstick However, when the signals from the alternate device are sent to the gaming console, the gaming console does not recognize that an alternate controller is being used. Because of this, the gaming console applies the controller assist techniques for the standard controller, essentially making the game feel uncontrollable. Even worse, every game uses a different combination and severity of these techniques.

A problem exists that a gaming console user does not have the right feel to a game when using an alternate controller to control a gaming console.

SUMMARY

Various systems, methods, and computer readable instructions are disclosed herein for modifying the signals sent from an alternate gaming controller to a gaming console, and inputting those signals to the gaming console, such that the user experiences the correct feel in controlling the game.

In one embodiment, the gaming controller includes a keyboard and mouse, and the gaming console expects to be controlled by a dual analog thumbstick controller. The output signals of the keyboard and mouse are modified to compensate for the dual analog thumbstick controller assist techniques employed by the gaming console. The modified signals are then inputted to the gaming console. The result is that the user is able to control the game with the keyboard and mouse with the same feel as if the user was using the dual analog thumbstick controller.

It should be noted that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects shown. The following figures are included.

DETAILED DESCRIPTION

Exemplary Game Console, PC, and Networking Aspects

Figure 1:
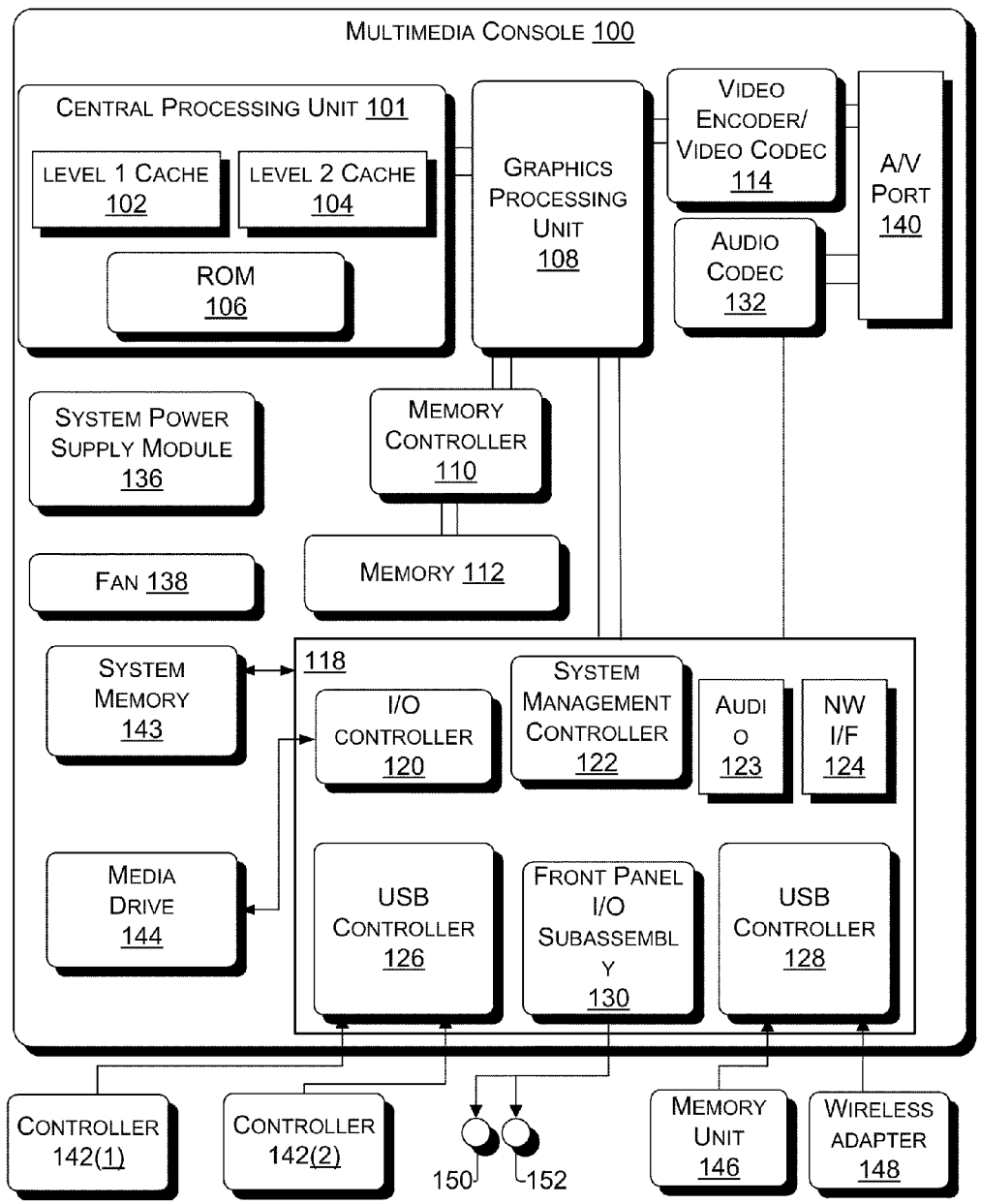
FIG. 1 illustrates an exemplary console for subject matter discussed herein.

This section of the present disclosure provides the general aspects of an exemplary and non-limiting game console. Referring now to FIG. 1, a block diagram shows an exemplary multimedia console. The multimedia console 100 has a central processing unit (CPU) 101 having a level 1 (L1) cache 102, a level 2 (L2) cache 104, and a flash ROM (Read-only Memory) 106. The level 1 cache 102 and level 2 cache 104 temporarily store data and hence reduce the number of memory access cycles, thereby improving processing speed and throughput. The flash ROM 106 may store executable code that is loaded during an initial phase of a boot process when the multimedia console 100 is powered. Alternatively, the executable code that is loaded during the initial boot phase may be stored in a flash memory device (not shown). Furthermore, ROM 106 may be located separate from CPU 101.

A graphics processing unit (GPU) 108 and a video encoder/video codec (coder/decoder) 114 form a video processing pipeline for high speed and high resolution graphics processing. Data is carried from the graphics processing unit 108 to the video encoder/video codec 114 via a bus. The video processing pipeline outputs data to an A/V (audio/video) port 140 for transmission to a television or other display. A memory controller 110 is connected to the GPU 108 and CPU 101 to facilitate processor access to various types of memory 112, such as, but not limited to, a RAM (Random Access Memory).

The multimedia console 100 includes an I/O controller 120, a system management controller 122, an audio processing unit 123, a network interface controller 124, a first USB host controller 126, a second USB controller 128 and a front panel I/O subassembly 130 that are preferably implemented on a module 118. The USB controllers 126 and 128 serve as hosts for peripheral controllers 142(1)-142(2), a wireless adapter 148, and an external memory unit 146 (e.g., flash memory, external CD/DVD ROM drive, removable media, etc.). The network interface 124 and/or wireless adapter 148 provide access to a network (e.g., the Internet, home network, etc.) and may be any of a wide variety of various wired or wireless interface components including an Ethernet card, a modem, a Bluetooth module, a cable modem, and the like.

System memory 143 is provided to store application data that is loaded during the boot process. A media drive 144 is provided and may comprise a DVD/CD drive, hard drive, or other removable media drive, etc. The media drive 144 may be internal or external to the multimedia console 100. Application data may be accessed via the media drive 144 for execution, playback, etc. by the multimedia console 100. The media drive 144 is connected to the I/O controller 120 via a bus, such as a Serial ATA bus or other high speed connection (e.g., IEEE 1394).

The system management controller 122 provides a variety of service functions related to assuring availability of the multimedia console 100. The audio processing unit 123 and an audio codec 132 form a corresponding audio processing pipeline with high fidelity, 3D, surround, and stereo audio processing according to aspects of the present disclosure described above. Audio data is carried between the audio processing unit 123 and the audio codec 126 via a communication link. The audio processing pipeline outputs data to the A/V port 140 for reproduction by an external audio player or device having audio capabilities.

The front panel I/O subassembly 130 supports the functionality of the power button 150 and the eject button 152, as well as any LEDs (light emitting diodes) or other indicators exposed on the outer surface of the multimedia console 100. A system power supply module 136 provides power to the components of the multimedia console 100. A fan 138 cools the circuitry within the multimedia console 100.

The CPU 101, GPU 108, memory controller 110, and various other components within the multimedia console 100 are interconnected via one or more buses, including serial and parallel buses, a memory bus, a peripheral bus, and a processor or local bus using any of a variety of bus architectures.

When the multimedia console 100 is powered on or rebooted, application data may be loaded from the system memory 143 into memory 112 and/or caches 102, 104 and executed on the CPU 101. The application may present a graphical user interface that provides a consistent user experience when navigating to different media types available on the multimedia console 100. In operation, applications and/or other media contained within the media drive 144 may be launched or played from the media drive 144 to provide additional functionalities to the multimedia console 100.

The multimedia console 100 may be operated as a standalone system by simply connecting the system to a television or other display. In this standalone mode, the multimedia console 100 may allow one or more users to interact with the system, watch movies, listen to music, and the like. However, with the integration of broadband connectivity made available through the network interface 124 or the wireless adapter 148, the multimedia console 100 may further be operated as a participant in a larger network community. In this latter scenario, the console 100 may be connected via a network to a server, for example.

Figure 2:
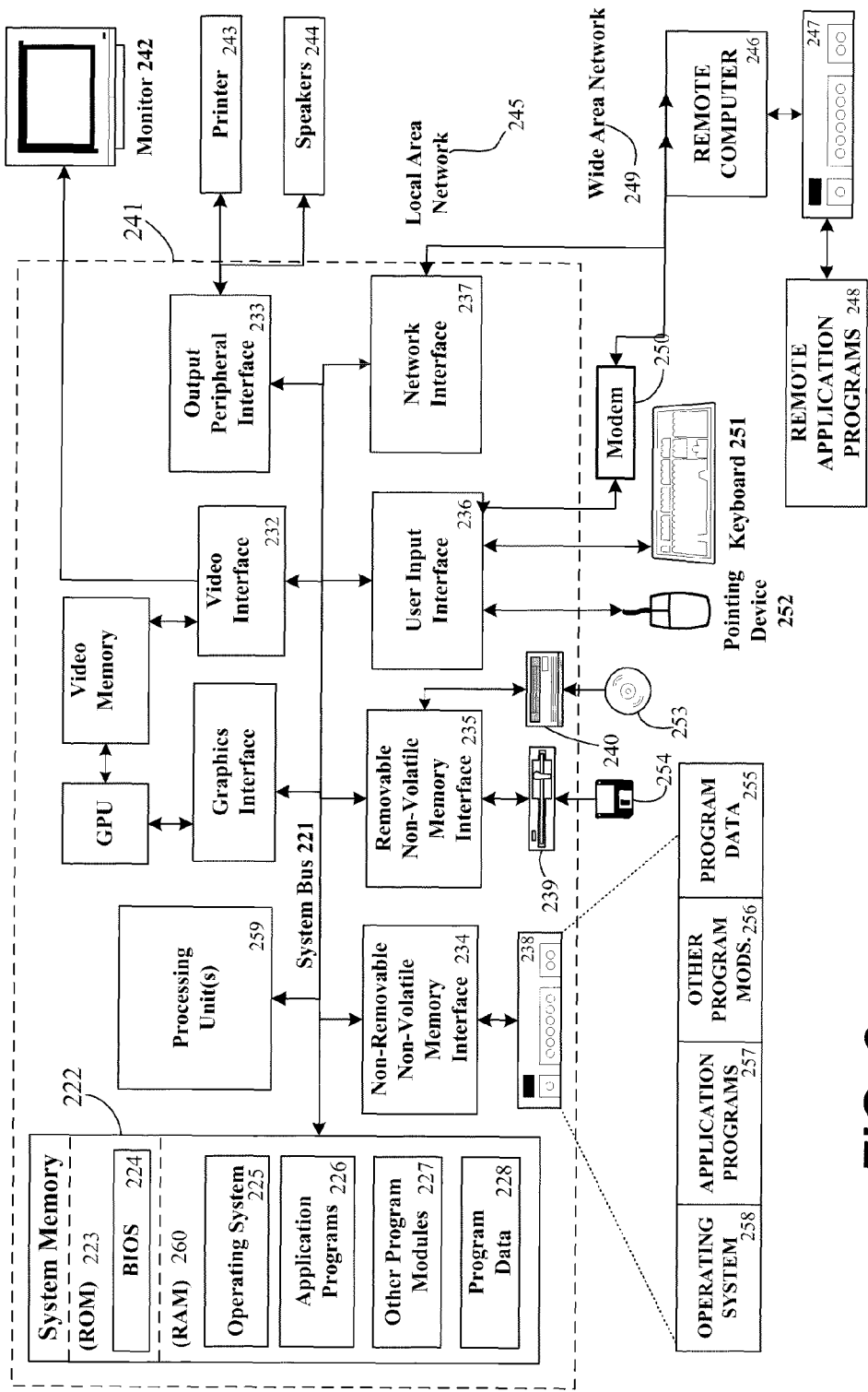
FIG. 2 illustrates an exemplary computing environment for subject matter discussed herein.

Second, now turning to FIG. 2, illustrated is a block diagram representing an exemplary computing device that may be suitable for use in conjunction with implementing the subject matter disclosed above. Numerous embodiments of the present disclosure may execute on a computer. For example, the computer executable instructions that carry out the processes and methods for providing PC experiences on gaming consoles may reside and/or be executed in such a computing environment as shown in FIG. 1. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computer 241 typically includes a variety of computer readable media. Computer readable media can be any available media that can be accessed by computer 241 and includes both volatile and nonvolatile media, removable and non-removable media. The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 2 illustrates operating system 225, application programs 226, other program modules 227, and program data 228.

The computer 241 may also include other removable/non-removable, volatile/nonvolatile computer storage media. By way of example only, FIG. 2 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through a non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 2, provide storage of computer readable instructions, data structures, program modules and other data for the computer 241. In FIG. 2, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through an output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 2. The logical connections depicted in FIG. 2 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 2 illustrates remote application programs 248 as residing on memory device 247. It may be appreciated that the network connections shown are exemplary and other means of establishing a communications link between the computers may be used.

Adaptation for Alternate Gaming Input Devices

Figure 3:
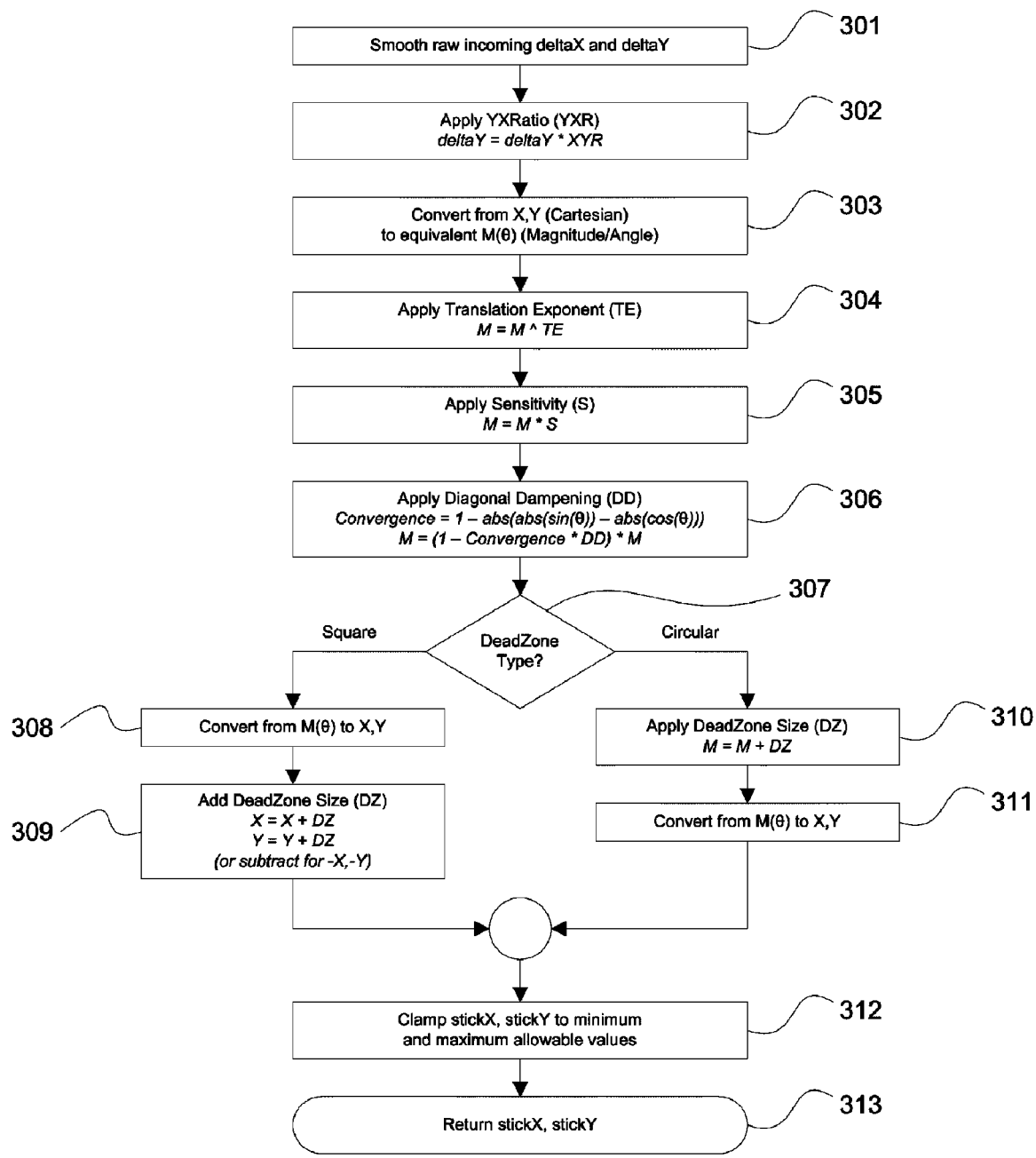
FIG. 3 illustrates an exemplary method of modifying the controller signals for input to the controller console.

Referring to FIG. 3, an embodiment of the invention is shown for modifying gaming controller signals which are outputted from the controller in Cartesian (X-Y plane) coordinates and/or vector values. The gaming controller may include a mouse, a thumbstick, a hand-held pointing device, a keyboard, a touchpad, a button array, a camera, or any similar device. Also, the gaming controller may include multiple devices, such as dual thumbsticks, a mouse and a keyboard, a hand-held pointing device and a keyboard, an RGB camera and a depth camera, and similar device combinations. It will be understood that many other embodiments are possible.

While it is possible to apply the following description to signals from many different controllers, the following description is occasionally illustrated by the example embodiment where a mouse is the alternate controller and a thumbstick is the standard controller. This example embodiment is used for explanatory purposes, and is not intended to limit the scope of the disclosure in any way.

In order to make the modifications shown in FIG. 3, the data must be in digital format. Where the gaming controller transmits signals in analog format, the signals must first be converted form analog to digital format (not shown). Methods of converting analog signals to digital values are well known in the art.

Step 301 smoothes the raw incoming data from the alternate gaming controller. Movement in the X and Y directions are labeled deltaX and deltaY, respectively. Smoothing is used to reduce jerky small delta movements in the alternate gaming controller. Smoothing is accomplished using a log (FILO queue) of input that is averaged and its result is used for further input processing. A "weight" concept is built in to allow for larger movements to be affected less by smoothing. This is done by comparing the input delta to a weight distribution extent (adjustable via "intensity") and using that ratio to determine how much of the log should be filled with the incoming input value. The more the log is filled, the more the average will be shifted to that of the input. Preferably, the log history is large enough to accommodate ⅒ second of input (meaning it will never take more than ⅒ second to stabilize on an constant input value). The smoothness factor varies from 0 to 1, where 0 has no smoothing effect and larger values (approaching 1) are more smooth but less responsive.

Step 302 applies a YX ratio to the smoothed raw data. Some gaming consoles recognize that, with the standard gaming controller, the user will have more sensitive control in one axis than the other axis. Where the standard gaming controller is a thumbstick, the user naturally has more control with its thumbs in the X direction than in the Y direction. Because of this, the console assigns a greater sensitivity level to movements in the Y direction. However, where the alternate gaming controller is a mouse, the user has roughly equal control in the X and the Y direction. The console will assign the greater sensitivity to the movements in the Y direction regardless of the controller. Thus, if the mouse signals are inputted to the console without modification, the console will assign a greater sensitivity level to the movements in the Y direction and the user will feel as if the movements in the Y direction are too sensitive. Thus, in step 302, the YX ratio is applied to the Y direction of the smoothed raw data in order to compensate for the console's greater sensitivity level in the Y direction.

Step 303 converts the modified alternate controller values from Cartesian values into polar (magnitude and angle) values. Methods of converting Cartesian values into polar values are well known.

Step 304 uses an exponential translation factor to adjust for the gaming console's acceleration compensation. An example of acceleration compensation occurs when a thumbstick is used to control speed in a gaming console. When a user manipulates a thumbstick, due to the user's lack of precision with the thumb, the user typically moves the thumbstick further than intended. Thus, when thumbstick position indicates velocity, the user typically will move the thumbstick to a higher velocity that desired. The gaming console's acceleration compensation adjusts the signal by accelerating to the velocity indicated by the thumbstick rather than immediately switching to the indicated velocity. This acceleration compensation gives the user time to adjust the thumbstick position before reaching the higher velocity. Where a mouse is used in place of a thumbstick, the user has more control over the mouse position. In this case, step 304 will modify the mouse movement values to reduce the time it takes for the console to accelerate to the velocity indicated by mouse position. When this adjusted signal is inputted into the gaming console, the result will be the same feel to the user as if the user was using a thumbstick. Exponential translation values range from 1 to 0 where 1 indicates no compensation, and the smaller the value, the greater the compensation.

Step 305 applies a sensitivity factor. Game consoles compensate for the overall sensitivity of the standard controller. For example, the user may have much more control over a mouse than with a thumbstick. The gaming console expects a low sensitivity input from the thumbstick, but it is actually receiving a high sensitivity input from the mouse. Thus, in order to give the user the proper feel, the mouse movement values must be modified so that the modified signals mimic those of a low sensitivity feel. Step 305 adjusts the magnitude of signal so that the sensitivity fed to the game console matches the sensitivity that the game controller expected. A sensitivity factor of 0 returns no movement. A sensitivity factor of 1 has no effect on the sensitivity of the signal sent to the console. Sensitivity factors between 0 and 1 decrease the magnitude of the signals and sensitivity factors over 1 increase the magnitude.

Step 306 applies a diagonal dampening factor. Game controllers have a certain sensitivity to diagonal movements, similar to the overall sensitivity described above regarding step 305. The diagonal dampening factor adjusts the input movement values to reduce the console's sensitivity of diagonal movements. A diagonal dampening factor of 0 does not reduce any diagonal sensitivity, and a diagonal dampening factor of 1 returns no diagonal movement.

After steps 301 through 306, the next step is to determine the dead zone type and size of the standard controller, as shown in step 307. A dead zone is an area of the controller that does not register as movement in the gaming console. For example, a thumbstick does not return to the same exact position when the user stops manipulating it. Because of this, the console recognizes an area (the dead zone) of thumbstick movement which does not register as movement within the game. In contrast, a mouse has no dead zone because it remains still when the user is not manipulating it. Without signal modification, if the mouse signals small movements, the gaming console may interpret the small movements as being movements within the thumbstick's dead zone. Yet, when using a mouse, the user expects even small movements to have an effect on the game. Thus, the thumbstick dead zone size must be added to the mouse movement values to offset the console's dead zone in order to give the user the same feel.

Step 307 determines whether the gaming console expects to have a square or circular dead zone. For a square dead zone, the dead zone size is already in X and Y coordinates. Thus, the signal must first be converted from polar values back to X-Y Cartesian values, as shown in step 308. Then, because a square dead zone's size is in X and Y values, the X-Y Cartesian values are modified by the size of the dead zone, as shown in step 309. For a circular dead zone, the size (radius) of the dead zone is already in polar magnitude form. Thus, the size of the dead zone is first added to the magnitude of the signal, as shown is step 310. Then, the signal is then converted back to X-Y Cartesian values, as shown is step 311.

Using the above example, after adjusting for the dead zone type and size, the resulting Cartesian values are substantially similar to those values which the thumbstick would produce if it were the controller being used by the user. Because these values represent the thumbstick equivalents, FIG. 3 refers to the Cartesian values as stickX and stickY.

Finally, step 312 clamps the stickX and stickY values to the minimum and maximum allowable values. The modification process outlined in steps 301 through 311 may result in a stickX and stickY which are larger or smaller than the values which the gaming console will recognize. Clamping the stickX and stickY values simply ensures that the values are within the range which the gaming console can accept.

Finally, step 313 returns the stickX and stickY values by inputting them into the gaming console. Where the gaming console expects to receive an analog signal, the stickX and stickY values must be converted from digital to analog form (not shown). Methods of converting from digital to analog are well known in the art.

Exemplary System Implementations

While the following describes exemplary system implementations, other implementations will be readily apparent to those skilled in the art.

Generally, the modification of game controller signals may take place anywhere between the controller and the gaming console, including within the game controller or the game console themselves.

Figure 4A:
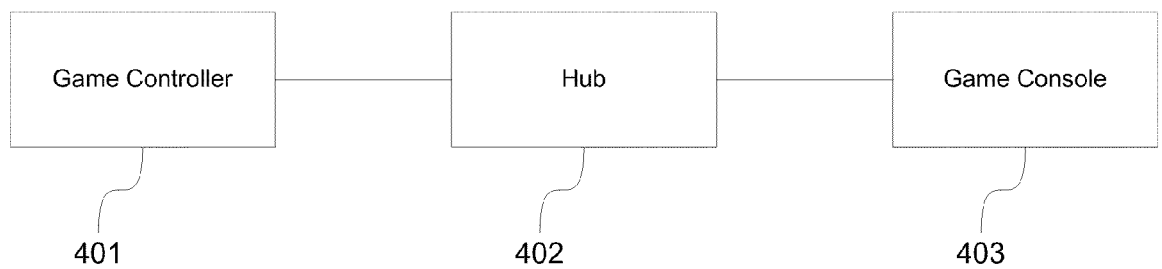
FIG. 4A illustrates an exemplary system of connecting a gaming controller to the gaming console via a hub.

Referring to FIG. 4A, a system may be configured where the game controller 401 is connected to a hub 402. Hub 402 is further connected to game console 403. The modification of signals from the game controller 401 may occur inside of game controller 401, inside hub 402, inside game console 403, or in the connections between each of them.

Figure 4B:
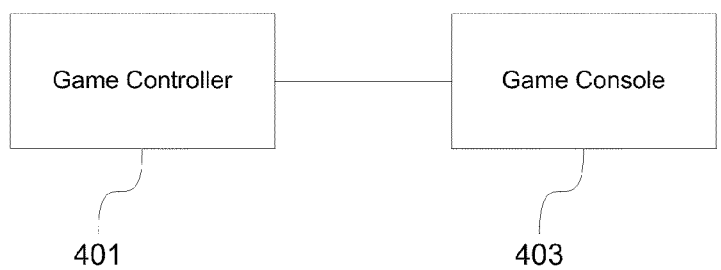
FIG. 4B illustrates an exemplary system of connecting a gaming controller directly to the gaming console.

Referring to FIG. 4B, a system may be configured where the game controller 401 is connected directly to game console 403. The modification of signals from the game controller 401 may occur inside of game controller 401, inside game console 403, or in the connections between them.

The foregoing description has set forth various embodiments of the apparatus and methods via the use of diagrams and examples. While the present disclosure has been described in connection with the preferred embodiments of the various figures, it is to be understood that other similar embodiments may be used or modifications and additions may be made to the described embodiment for performing the same function of the present disclosure without deviating there from. Therefore, the present disclosure should not be limited to any single embodiment, but rather construed in breadth and scope in accordance with the appended claims. Additional features of this disclosure are set forth in the following claims.

What is claimed is:

1. A method for controlling a gaming console with a gaming controller, comprising:
   receiving at least one first signal sent from a first gaming controller to control an aspect of a gaming console configured to receive at least one second signal from a second gaming controller;
   converting a polar value representative of said at least first signal to a Cartesian value representative of said at least one second signal, the Cartesian value representative of said at least one second signal being substantially similar to a value that would result from receiving the at least one second signal, the converting comprising:
      determining a dead zone type of said second gaming controller,
      if said dead zone type is circular, adjusting the polar value by a size of the dead zone and then converting the adjusted polar value to a Cartesian value representative of said at least first signal, and
      if said dead zone type is not circular, converting the polar value to a Cartesian value representative of said at least first signal and then adjusting the Cartesian value representative of said at least first signal by a dead zone size; and
   submitting the Cartesian value representative of said at least first signal to some component of said gaming console.

2. The method of claim 1, wherein said submitting the Cartesian value representative of said at least first signal comprises:
   generating a modified first signal based on the Cartesian value representative of said at least first signal; and
   inputting said modified first signal to said gaming console.

3. The method of claim 1, further comprising applying a YX ratio.

4. The method of claim 1, wherein said converting a polar value representative of said at least first signal comprises applying a translation exponent to the polar value representative of said at least first signal.

5. The method of claim 1, wherein said converting a polar value representative of said at least first signal comprises applying a sensitivity factor to the polar value representative of said at least first signal.

6. The method of claim 1, wherein said converting a polar value representative of said at least first signal comprises clamping the Cartesian value representative of said at least first signal to the minimum and maximum values which can be recognized by said gaming console.

7. The method of claim 1, wherein said converting a polar value representative of said at least first signal comprises applying a diagonal dampening factor to the polar value representative of said at least first signal.

8. The method of claim 7, the applying a diagonal dampening factor comprising applying the formula:

$$M=(1-(1-\|\sin\theta|-|\cos\theta\|)*DD)*M,$$

where M is a magnitude of value representative of said at least first signal, $\theta$ is an angle of the value representative of said at least first signal, and DD is the diagonal dampening factor.

9. A system for controlling a gaming console with a gaming controller, comprising:
   a first gaming controller operatively connected to a gaming console, the gaming console configured to receive at least one second signal from a second gaming controller;
   a first subsystem configured to receive at least one first signal sent from said first gaming controller to control an aspect of said gaming console;
   a second subsystem configured to convert a polar value representative of said at least first signal to a Cartesian value representative of said at least one second signal, the Cartesian value representative of said at least one second signal being substantially similar to a value that would result from receiving the at least one second signal, the second subsystem configured to convert by:
      determining a dead zone type of said second gaming controller,
      if said dead zone type is circular, adjusting the polar value by a size of the dead zone and then converting the adjusted polar value to a Cartesian value representative of said at least first signal, and
      if said dead zone type is not circular, converting the polar value to a Cartesian value representative of said at least first signal and then adjusting the Cartesian value representative of said at least first signal by a dead zone size; and
   a third subsystem configured to submit the Cartesian value representative of said at least first signal to some component of said gaming console.

10. The system of claim 9, wherein said second subsystem is located within said first gaming controller.

11. The system of claim 9, wherein said second subsystem is located within said gaming console.

12. The system of claim 9, further comprising:
a hub operatively connected between said first gaming controller and said gaming console.

13. The system of claim 12, wherein said second subsystem is located within said hub.

14. A computer-readable storage medium containing instructions for controlling a gaming console with a gaming controller, the instructions comprising:
instructions to receive at least one first signal sent from a first gaming controller to control an aspect of a gaming console configured to receive at least one second signal from a second gaming controller;
instructions to convert a polar value representative of said at least first signal to a Cartesian value representative of said at least one second signal, the Cartesian value representative of said at least one second signal being substantially similar to a value that would result from receiving the at least one second signal, the instructions to convert comprising:
instructions to determine a dead zone type of said second gaming controller,
instructions to adjust the polar value by a size of the dead zone and then converting the adjusted polar value to a Cartesian value representative of said at least first signal if said dead zone type is circular, and
instructions to convert the polar value to a Cartesian value representative of said at least first signal and then adjusting the Cartesian value representative of said at least first signal by a dead zone size if said dead zone type is not circular; and
instructions to submit the Cartesian value representative of said at least first signal to some component of said gaming console.

15. The computer-readable storage medium of claim 14, said instructions to submit the converted value representative of said at least first signal comprising:
instructions to generate a modified first signal based on the Cartesian value representative of said at least first signal; and
instructions to input said modified first signal to said gaming console.

16. The computer-readable storage medium of claim 14, the instructions further comprising instructions to apply an YX ratio.

17. The computer-readable storage medium of claim 14, the instructions to convert a polar value representative of said at least first signal further comprising instructions to apply a translation exponent to the polar value representative of said at least first signal.

18. The computer-readable storage medium of claim 14, the instructions to convert a polar value representative of said at least first signal further comprising instructions to apply a sensitivity factor to the polar value representative of said at least first signal.

19. The computer-readable storage medium of claim 14, the instructions to convert a polar value representative of said at least first signal further comprising instructions to clamp the Cartesian value representative of said at least first signal to the minimum and maximum values which can be recognized by said gaming console.

20. The computer-readable storage medium of claim 14, the instructions to convert a polar value representative of said at least first signal further comprising instructions to apply a diagonal dampening factor to the polar value representative of said at least first signal.

21. The computer-readable storage medium of claim 20, the instructions to apply a diagonal dampening factor comprising instructions to apply the formula:

$$M = (1-(1-\|\sin\theta|-|\cos\theta\|)*DD)*M,$$

where M is a magnitude of value representative of said at least first signal, $\theta$ is an angle of the value representative of said at least first signal, and DD is the diagonal dampening factor.

* * * * *